Oct. 31, 1967  H. (HARRY) A. THOMSON  3,349,454
RETAINING APPARATUS
Filed Aug. 16, 1965
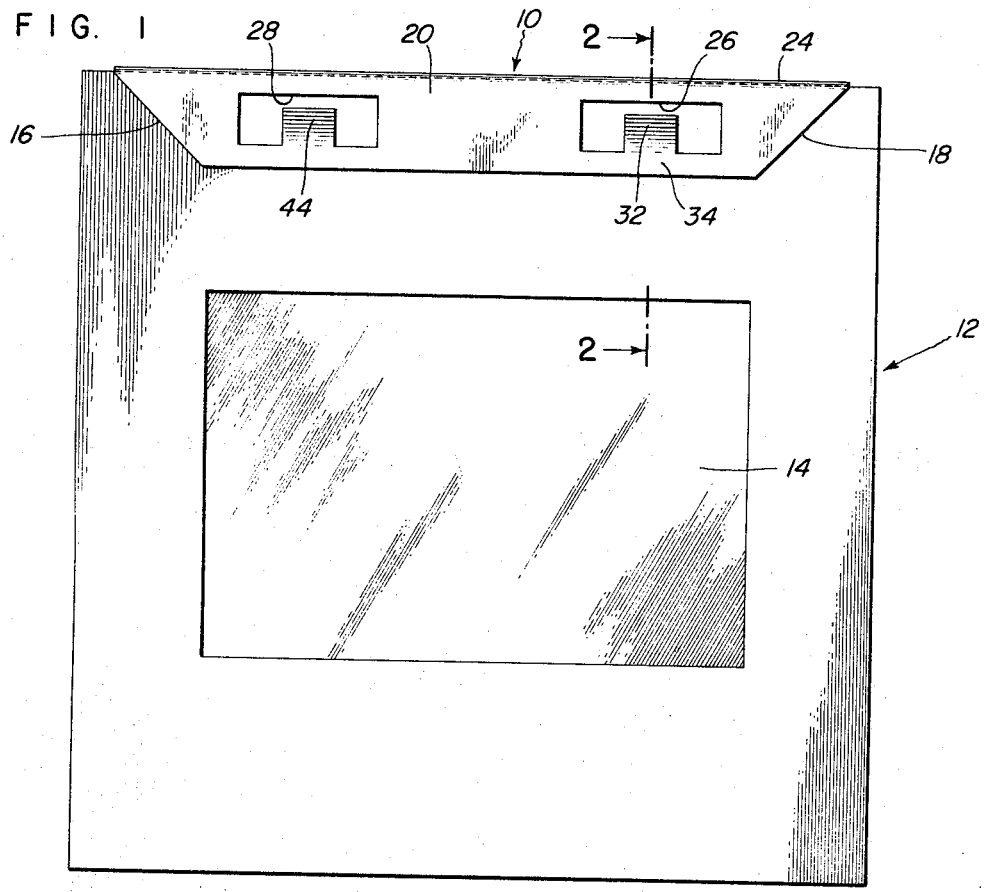
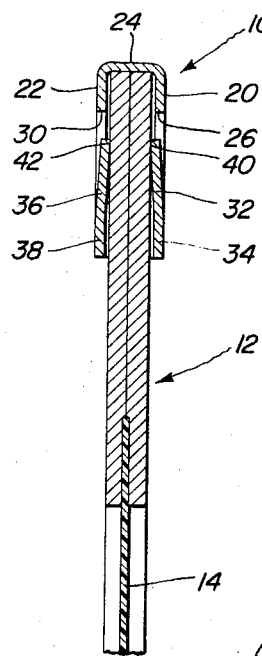
INVENTOR.
H. HENRY A. THOMSON
BY John Shaw Stevenson
AGENT.

United States Patent Office 3,349,454
Patented Oct. 31, 1967

3,349,454
RETAINING APPARATUS
Henry (Harry) A. Thomson, Denver, Colo., assignor to Honeywell Inc., Minneapolis, Minn., a corporation of Delaware
Filed Aug. 16, 1965, Ser. No. 479,910
1 Claim. (Cl. 24—259)

It is an object of the present invention to disclose a slide clip for a slide used in viewing instruments such as a slide projector.

One of the problems encountered with commercially-available clips while the slide is being lifted by a magnet from its in-tray position to its projecting position or is being returned to its slide tray position is that continuous use of these slide clips in a projector in this manner will cause them to lose their grip on the slide and to be pulled off the edge of the slide.

More specifically, it is another object of the present invention to disclose a clip which can be easily mounted on an edge portion of a slide and which cannot be pulled free of the slide by the action of the magnetic slide changing element that is employed in a commercially-available magnetic slide projector.

Often it is desirable for a person to show slides in a non-magnetic type of projector that is not provided with a magnetic slide changing element and which requires the clips on the slide that has been used in the aforementioned magnetic projector to be removed in a manner that will not cause any damage to the slide before these slides are in a condition to be used in the non-magnetic type of projector.

It is, therefore, another object of the invention to disclose a clip for a slide which will not cause damage to the outer transparency-supporting portion of the slide when the clip is removed therefrom.

It is still another object of the present invention to disclose a clip construction which will enable a number of these slides to be packed in close proximity with one another in a carton without any fear of their tangs becoming entangled with one another.

It is another object of the invention to disclose a slide clip that can readily be brought into secured engagement with a slide by pushing it onto one edge of the slide and which can readily be removed by sliding it in either a right or left direction along that edge of the slide.

In the drawing:

FIGURE 1 is a front view of the clip in assembled gripping engagement with the edge of a slide, and;

FIGURE 2 is a partial section taken through the line 2—2 of FIGURE 1.

FIGURE 1 of the drawing shows the unique clip 10 disclosed therein mounted on the top edge of a slide 12 which carries a transparency 14 in the center portion thereof.

The clip 10 is made of a resilient material and is of a substantially inverted U-shaped configuration as shown in FIGURE 2. The right and left end portions 16, 18 of the clip are tapered inwardly as shown in FIGURE 1.

The clip 10 is preferably made of a single piece of resilient material and is comprised of side portions 20, 22 which are shown joined by means of a connecting portion 24.

The side portion 20 is as shown having two spaced-apart inverted U-shaped apertured wall portions 26, 28 therein. The other side wall 22 is shown having an inverted U-shaped apertured wall portion 30 which is opposite and identical in size to the apertured wall portion 26 in side portion 20. Another similar inverted U-shaped apertured wall, not shown, is positioned at the left end of the clip as shown in FIGURE 1 immediately opposite and behind the inverted U-shaped apertured wall 28 as shown in the side wall 20.

The side wall 20 of the clip 10 is best shown in FIGURE 2 as having a resilient tang 32 extending in an upward and inward direction from the portion 34 of its side wall 20. The opposite side wall 22 of the clip 10 is also shown having a similar resilient tang 36 extending in an inward direction from the portion 38 of its side wall 22.

Each of these tangs 32, 36 are preferably of a rectangular shape and are shown in FIGURE 2 as being in the form of a cantilever.

Because the extending upper end of the tangs 32, 36 are shown located inwardly of their associated sides 20, 22, it can be seen that the entire spring force which the side portions 20, 22 apply will be concentrated for application to the slide 12 at the upper top portions 40, 42 of the tangs 32, 36. It can further be seen that this cantilever type force which the top portion 40 applies in the aforementioned manner to the right surface of the slide 12 will be in opposition to the force that the top portion 42 applies to the left surface of the slide 12. This slide connection of the clip and the similar connections made by the tang 44 and an opposite tang (not shown) which is mounted on the side plate 22 will, therefore, at all times retain the clip 10 in tight clasping engagement with the opposite sides of the slide and at the same time enable the clip 10 to be readily mounted by pushing the portions 34, 38 in sliding contact down over their associated sides of the slide 12 to the position shown in FIGURES 1 and 2. The clip 10 can readily be removed from its mounted position as shown in FIGURE 1 by merely sliding it off the side of the slide 12.

From the aforementioned description, it can be seen that a slide clip 10 has been disclosed that cannot be removed when it is being pulled or pushed by a magnet of a magnetic slide projector and which can readily be pushed on and said slid off of a slide without damage to the slide.

What is claimed is:

A slide retaining clip, comprising a unitary resilient, elongated inverted U-shaped member having two side leg portions and a top portion extending between the two side leg portions, one of the side leg portions being comprised of two spaced-apart walls forming elongated inverted U-shaped slots therein, the other one of the side leg portions comprising two spaced apart walls forming elongated inverted U-shaped slots that are respectively aligned with one of the spaced apart walls in the other side leg portion, a tang forming a central wall portion of each of the four walls extending from a side portion adjacent the base in an upward and inward direction in a cantilever fashion toward the top portion each tang being adapted to have a width as taken along the side leg surfaces of the clip that is substantially the same size but of a greater dimension than each of the vertical legs forming the inverted U-shaped slot to enable the top inner surface of the tangs to be canted into spring biased firm clamping engagement with opposite top surfaces of a slide when the slide clip is moved in a vertical direction and to be slidably disengaged from the slide by moving it longitudinally along the top surface of the slide.

References Cited
UNITED STATES PATENTS

| | | |
|---|---|---|
| 561,104 | 6/1896 | Gawler. |
| 1,699,887 | 1/1929 | Goldstein _____ 24—265 |
| 1,763,024 | 6/1930 | Underhill et al. _____ 40—23 |
| 2,816,381 | 12/1957 | Jablon _____ 40—152 |
| 2,895,247 | 7/1959 | Beck et al. _____ 40—152 |
| 3,208,119 | 9/1965 | Seckerson _____ 24—259 X |

DONALD A. GRIFFIN, Primary Examiner.